United States Patent Office 3,510,557
Patented May 5, 1970

3,510,557
UREA DERIVATIVES AS THERAPEUTIC AGENTS
Albert Rene Joseph Castaigne, Toulouse, France, assignor to Centre d'Etudes pour l'Industrie Pharmaceutique, Toulouse, France
No Drawing. Filed Feb. 23, 1967, Ser. No. 617,831
Claims priority, application France, Mar. 2, 1966, 51,618
Int. Cl. A61k 27/00
U.S. Cl. 424—248  9 Claims

ABSTRACT OF THE DISCLOSURE

Urea derivatives of formula

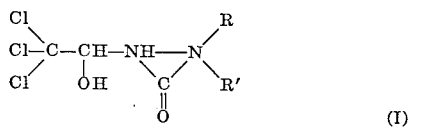

(I)

wherein R and R', which may be the same or different, represent hydrogen, a lower alkyl radical having 1–6 carbon atoms, a benzyl radical or a morpholino-carbonyl radical useful in human therapeutics for their tranquilizing, relaxing and anxiolytic properties.

---

The present invention has for its object urea derivatives having in particular tranquilizing, relaxing and anxiolytic properties.

These derivatives have the general formula

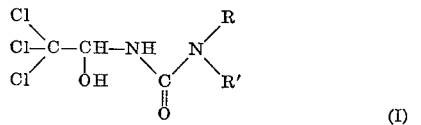

(I)

wherein R and R' are each a member selected from the group consisting of hydrogen, a lower alkyl radical having 1–6 carbon atoms, the benzyl radical and the morpholino-carbonyl radical.

The derivatives of Formula I above are prepared by reacting chloral hydrate with an urea of formula

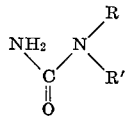

wherein R and R' have the above defined meanings.

The reaction proceeds as represented below:

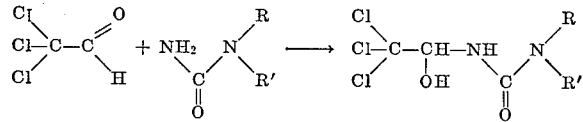

The reaction is effected in the presence of small amounts of inorganic acids such as HF, HCl, HBr, HI, or of organic acids or inorganic bases such as NaOH, KOH, Ca(OH)$_2$, or of organic bases acting as catalysts.

The following examples are given to illustrate the preparation of the compounds of Formula I.

Example 1.—Preparation of trichloro-ethylolurea
(R=R'=H)

Chloral hydrate (165.5 g.) and urea (60 g.) are mixed in a beaker. Hydrochloric acid (½ ml.) is then added, with stirring. The temperature increases slowly and the liquid sets to a mass. Upon dissolution in alcohol and reprecipitation with water, there are obtained trichloroethylolurea crystals having a melting point of 185–188° C.

Example 2.—Preparation of trichloro-ethylol-methyl-urea
(R=H,R'=CH$_3$)

Chloral hydrate (165.5 g.) and N-methyl-urea (74 g.) are mixed in a beaker. After liquefying over the water-bath, ½ ml. hydrochloric acid is added. Upon recrystallization from boiling water, there is obtained a crystalline white powder partly soluble in water, acetic acid and ether, soluble in alcohol and pyridine, insoluble in hydrocarbons and chloroform, having a melting point of 135–140° C.

Example 3.—Preparation of trichloro-ethylol-N-morpholido-urea

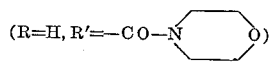

Chloral hydrate (165.5 g.) and morpholido-urea (130 g.) are mixed in a beaker. After liquefying over the water-bath, ½ ml. hydrochloric acid is added. The product sets to a mass while warming up, and, upon recrystallization from an acetone-water-alcohol mixture, there is obtained a product having a melting point of 190–195° C.

Example 4.—Preparation of trichloro-ethylol-benzyl-urea
(R=H,R'=—CH$_2$—C$_6$H$_5$)

Chloral hydrate (165.5 g.) and benzyl urea (150 g.) are mixed in a beaker. The beaker is held over a boiling water-bath until the mixture is liquefied. One-half ml. of hydrochloric acid is then added, and the mixture is stirred. The temperature increases slowly while the liquid sets to a mass.

The precipitate is dissolved with alcohol, and is then reprecipitated by addition of water, and there are obtained trichloro-ethylol-benzyl-urea crystals, having a melting point of 131–132° C.

The invention has for its object a method of treating patients suffering from emotional disorders, comprising administering to said patients, an urea derivative of the aforesaid Formula I.

The composition used for the administration is usually formulated in unit dosage form such as tablets, coated tablets and capsules for oral administration, injectable ampoules for parenteral administration, and suppositories for rectal administration.

Each unit dosage may contain from about 50 to about 300 mg. of active principle in association with the usual vehicles or excipients suitable for such administrations.

There will be given below, as nonlimiting examples, five formulations for tablets, coated tablets, capsules, injectable ampoules and suppositories.

Formulation No. 1—Capsules

|  | G. |
|---|---|
| Trichloro-ethylol-urea | 0.175 |
| Magnesium stearate, q.s. to make | 0.200 |

Formulation No. 2—Tablets

| | |
|---|---|
| Trichloro-ethylol-methyl-urea | 0.200 |
| Polyvinyl pyrrolidone | 0.005 |
| Talcum | 0.010 |
| Levilite (colloidal silica) | 0.010 |
| Lactose, q.s. to make 1 tablet. | |

Formulation No. 3—Coated tablets

Core:
| | |
|---|---|
| Trichloro-ethylol-N-morpholido-urea | 0.150 |
| Talcum | 0.010 |
| Sugar, q.s. to make | 0.150 |

Coating:
| | |
|---|---|
| Shellac | 0.012 |
| Gum arabic | Trace |
| Talcum | 0.015 |
| Amaranth | Trace |
| White wax | Trace |
| Granulated sugar, q.s. to make 1 tablet. | |

Formulation No. 4—Suppositories

Trichloro-ethylol-methyl-urea _____ 0.100
Semisynthetic glycerides, q.s. to make 1 suppository.

Formulation No. 5—I.M. or I.V. Injectable ampoules

Trichloro-ethylol-methyl-urea _____ 0.050
Isotonic solvent, q.s. to 3 ml.

The preparation of such capsules, tablets, coated tablets and injectable ampoules is effected in the conventional manner for the production of such pharmaceutic forms.

Because of the very low toxicity of the active principle, the composition may be administered at a daily dosage regimen varying within wide limits depending on the case to be treated, the daily dosage varying, for example, from 0.050 to 0.800 g. or more of the active principle per 24 hours.

The urea derivatives of Formula I exhibit useful therapeutic properties. They are endowed with tranquilizing effects and may be used as a psychotropic composition for the purpose of obtaining a sedation accompanied by a relaxing and anxiolytic effect. This action is demonstrated by the data resulting from the pharmacological and clinical tests which are given below, together with those of the toxicological tests.

(A) Toxicological investigation

It related to:

1—The acute toxicity of the urea derivatives,
2—The chronic toxicity,
3—The local and systemic tolerance,
4—The potential teratogenic effects, and has made it possible to find that the derivatives are perfectly tolerated both by gastric intubation and by the intraperitoneal or rectal routes, without causing any local or systemic reaction.

The hematological tests effected systematically have shown that there is no hematological involvement; no signs of inflammation or injury could be detected in the viscera, on histological examination of the sacrificed animals both at the end of the experimentation period and thirty days later. It is free from teratogenic effects.

As an indication, the $LD_{50}$ of the trichloro-ethylol-urea determined during the toxicity tests, is of 1.850 g. per kg. of body weight in mice, administered by gastric intubation.

(B) Pharmacological investigation

The tranquilizing action of the urea derivatives was investigated by means of six methods:

(1°) Potentiation of barbiturates.—From the test, effected with two lots of mice, it is found that a weak dosage of barbiturate, usually insufficient to induce sleep, becomes hypnogenic when administered after the compound of Formula I.

Thus, to lot (A), there is administered by gastric intubation, a dose of compound of Formula I, suspended in a 5% aqueous gum arabic solution. One-half hour later, lots (A) and (B) are made to ingest 20 mg./kg. of phenobarbital in solution in physiological saline solution. It is found that the mice of reference lot (B) remain awake, while 60% of the mice of treated lot (A) are put to sleep.

(2°) Resumption of sleep after chloral-induced sleep. —Two lots of 10 Wistar rats are given 225 mg./kg. of chloral by the intraperitoneal route; this dosage puts them to sleep. On awakening, lot (A) is administered a dose of compound of Formula I; 80% of the rats of lot (A) resume their sleep.

(3°) Escape test (Boissier, Arch. Int. Pharmacodyn., 1961, CXXXIII, 1–2).—One hour after oral treatment with the compound of Formula I, mice are placed in a rectangular box provided with a latticed inclined plane. The mice which have not escaped within 5 minutes are considered as tranquilized. It is found that a high percentage of the treated mice remains in the box.

(4°) Shaking-cage test, to evaluate the degree of tranquilization of the treated rats.—One hour after treatment with the compound of Formula I, lots of rats are placed in a cage suspended to springs and provided with a stiletto which records faithfully, on a kymograph, all the movements imparted to the cage by the displacements of the experimental animals. The results are steady and show that the product according to the invention has a marked tranquilizing action, without any interfering agitation.

(5°) Chimney test.—Mice introduced in a glass tube of given size must, to escape, climb up backwards. The mice are selected prior to the treatment so that they will effect the operation within less than 20 seconds, and are considered tranquilized when the time taken for this climb is in excess of 30 seconds. This result is obtained using the compounds of Formula I which, at therapeutic doses, extend considerably the time necessary for this climb up the chimney.

(6°) Traction test.—This test comprises suspending mice by their fore-limbs. Any animal which is unable, within 30 seconds, to pull at least one of its hind legs up on the wire is considered as being under a sedative action. The animals are pretested, and those which are not suitable are rejected. It is found that a low percentage of mice treated with the compounds of Formula I are successful in pulling themselves up within less than 30 seconds.

The results of the above described tests demonstrate that the compounds according to the invention:

1—Produce substantial sedative effects, decrease agitation and aggressivity,
2—Do not suspend motility,
3—Potentiate the barbiturates,
4—Cause the resumption of sleep in rats waking up from a chloral-induced primary sleep,
5—Produce, at therapeutic dosages, a sedation free from hypnotic effects,
6—Produce their action at dosages far remote from the $LD_{50}$ which is important where psychotropic compounds are concerned, since there are numerous materials which are active only at prelethal dosages.

To summarize, the present investigation demonstrates that the compounds according to the invention exhibit useful therapeutic properties: they are endowed with a marked tranquilizing and sedative, although nonhypnotic, action and have very low toxicity at the efficient dosages.

The therapeutic efficiency of the urea derivatives is demonstrated by the following clinical investigation.

(C) Clinical investigation

The composition was administered successfully, as tranquilizer, to more than 50 patients exhibiting disorders characterized by emotional tension, anxiety, worry or anguish. It produced in such patients an effect of appeasement and quietude, of relief of strain and of muscular relaxation, without producing unpleasant secondary effects, nor drowsiness, or obnubilation. Its relaxing action, which results in mental quietude, regularizes sleep (which is often perturbed), and standardized both the behavior and the emotional responses to external stimuli.

This clinical investigation shows that:

(a) Treatment with the urea derivatives benefits by an excellent clinical tolerance;

(b) Biological tolerance is satisfactory. The products have no detectable hematological effect. There were noted no substantial modifications of the blood urea level, or of the chloesterol level, and no perturbations of the hepatic tests.

(c) The clinical efficiency of the urea derivatives is excellent for the treatment of emotional disorders expressed by manifestations of nervousness such as instability, intolerance to causes of annoyance, sensitiveness, reactive aggressiveness, by manifestations of anxiety such as worry, anguish, by depressive reactive manifestations, secondary to overwork, to work or living conditions, by phychosomatic, cardiovascular, digestive, gynecological, respiratory, dermatological conditions, by disorders of one's character, by sleep disorders.

Having now described my invention what I claim as new and desire to secure by Letters Patent is:

1. A method of obtaining tranquilizing effects in a patient comprising administering to said patient from 0.050 to 0.800 g. daily of a urea derivative of formula

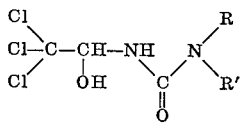

(I)

wherein R and R' are each a member selected from the group consisting of hydrogen, methyl, benzyl and morpholino-carbonyl.

2. A method as claimed in claim 1, wherein said urea derivative is trichloro-ethylol-urea.

3. A method as claimed in claim 1, wherein said urea derivative is trichloro-ethylol-methyl-urea.

4. A method as claimed in claim 1, wherein said urea derivative is trichloro-ethylol-N-morpholino-carbonyl-urea.

5. A method as claimed in claim 1, wherein said urea derivative is trichloro-ethylol-benzyl-urea.

6. A method as claimed in claim 1, wherein said urea derivative is administered in dosage units containing each from 50 to 300 mg. of said derivative and a pharmaceutically acceptable carrier.

7. A method as claimed in claim 1, wherein said urea derivative is administered orally.

8. A method as claimed in claim 1, wherein said urea derivative is administered parenterally.

9. A method as claimed in claim 1, wherein said urea derivative is administered rectally.

References Cited

UNITED STATES PATENTS 2,619,416  11/1962  King _____ 71—2.5

OTHER REFERENCES

Chemical Abstracts I, vol. 47, 2424$^b$.
Chemical Abstracts II, vol. 41, 3902$^d$–3905$^a$.
Chemical Abstracts III, vol. 28, 1988$^8$–1989$^6$.
Chemical Abstracts IV, vol. 38, 1507$^9$–1508$^6$.

ALBERT T. MEYERS, Primary Examiner

S. J. FRIEDMAN, Assistant Examiner

U.S. Cl. X.R.

260—247.2, 553; 424—322